(12) United States Patent
Stevens

(10) Patent No.: US 6,636,019 B2
(45) Date of Patent: Oct. 21, 2003

(54) UNINTERRUPTABLE POWER SUPPLY WITH ENERGY CONTROL

(76) Inventor: Carlile R. Stevens, 4119 Highway 2147, Suite 6, Marble Falls, TX (US) 78654

( * ) Notice: Subject to any disclaimer, the term of this patent is extended or adjusted under 35 U.S.C. 154(b) by 0 days.

(21) Appl. No.: 10/103,050

(22) Filed: Mar. 20, 2002

(65) Prior Publication Data

US 2002/0145338 A1 Oct. 10, 2002

Related U.S. Application Data

(60) Provisional application No. 60/281,839, filed on Apr. 6, 2001.

(51) Int. Cl.[7] .................................................. H02J 7/00
(52) U.S. Cl. ....................................... 320/128; 320/127
(58) Field of Search ................................. 320/128, 127, 320/135, 136; 307/64–66; 363/37, 44, 89, 97, 98

(56) References Cited

U.S. PATENT DOCUMENTS

| | | | | |
|---|---|---|---|---|
| 4,673,825 A | * | 6/1987 | Raddi et al. | 307/66 |
| 4,935,861 A | * | 6/1990 | Johnson, Jr. et al. | 363/132 |

* cited by examiner

Primary Examiner—Lawrence Luk
(74) Attorney, Agent, or Firm—Roger A. Marrs

(57) ABSTRACT

An uninterruptible power supply with energy control includes a source of direct current (DC) voltage and current with a battery coupled to an inverter. The output from the inverter is applied to a computer or other loads. A charger is disposed between power line input and the battery as a component of the direct current source.

4 Claims, 1 Drawing Sheet

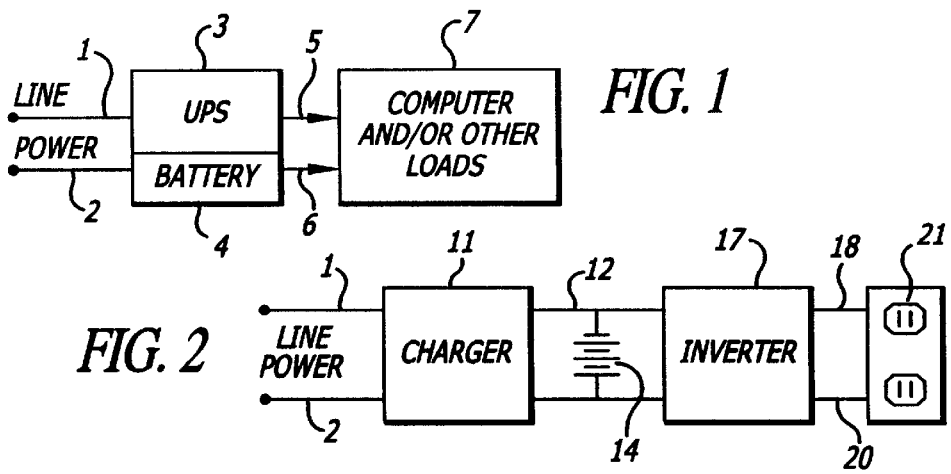
FIG. 1
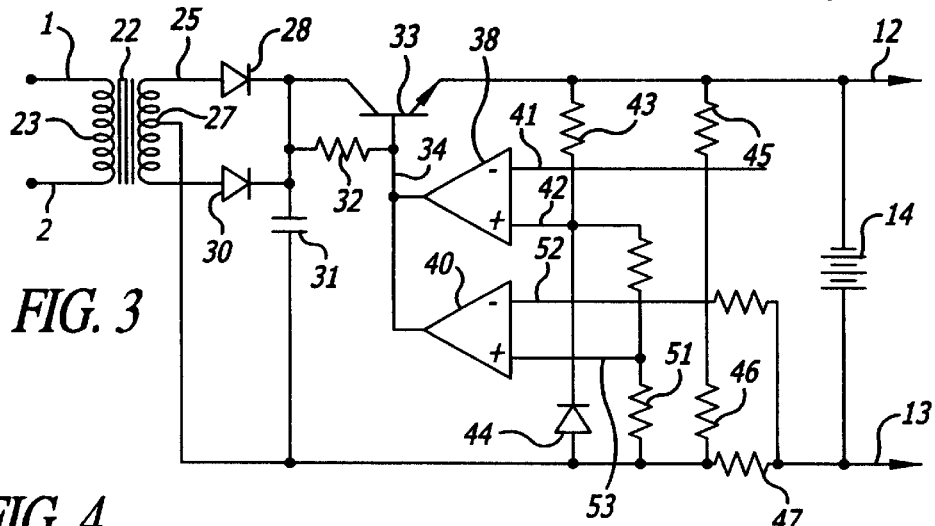
FIG. 2
FIG. 3
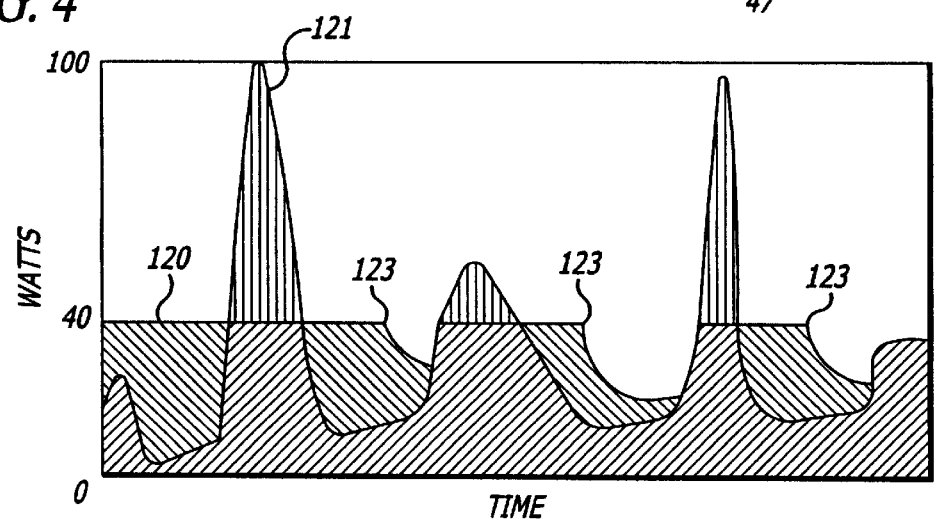
FIG. 4

_US 6,636,019 B2_

UNINTERRUPTABLE POWER SUPPLY WITH ENERGY CONTROL

Priority claimed Based on Ser. No. 60/281,839 filed Apr. 6, 2001.

BACKGROUND OF THE INVENTION

1. Field of the Invention

The present invention relates to the field of power circuits and particularly to an uninterruptable power supply (UPS) inserted between a source of AC power and a load such as a computer monitor or other computer peripherals designed to supply power to the load in the event the source of AC power should be interrupted for some predetermined period of time. This concept provides for a UPS unit inserted between a source of AC line power and its load in order to draw only a fixed amount of power from the AC power source.

2. Description of Prior Art

There are a great number of uninterruptable power supplies on the market today and can be divided into two basic types. The first type of circuit continues to supply power when the power fails. The second type of circuit supplies the power continuously to a selected load from a battery which is continuously charged while the power line signal is present. With this circuit, no switching is required. The latter type is not as efficient as the former since it must operate continuously whereas the former type draws power directly from the power line unless there is a failure. A third type of uninterruptable power supply is disclosed in U.S. Pat. No. 5,737,209, issued on Apr. 7, 1998, wherein a direct current output is presented to the load by the uninterruptable supply.

Therefore, a need has existed to provide a UPS circuit to a load when no interruption from an AC source is present when the load requires more power than a predetermined amount.

SUMMARY OF THE INVENTION

The subject invention deals with the second type of uninterruptable supply noted above which provides a circuit having a limit on the amount of power that can be drawn from an AC power line forcing a battery to supply that additional power whenever power it is needed and allowing the battery or batteries to be recharged when the power from the line is not needed.

Therefore, it is an object of this invention to control the amount of energy that is drawn from a AC power source such that it will not exceed a predetermined amount.

Another object of the invention is to incorporate changes in existing UPS devices to accomplish a peak energy control.

Yet another object in this invention is to do all of these things in a manner that is economical and that would be commercially accepted

BRIEF DESCRIPTION OF THE DRAWINGS

The features of the present invention which are believed to be novel are set forth with particularity in the appended claims. The present invention, both as to it organization and manner of operation, together with further objects and advantages thereof, may best be understood with reference to the following description, taken in connection with the accompanying drawings in which:

FIG. 1 is a basic block diagram of a UPS installation;

FIG. 2 is a block diagram of the internal components in the UPS installation shown in FIG. 1;

FIG. 3 is a complete circuit diagram of the UPS installation; and

FIG. 4 is a graph illustrating the amount of power drawn from the power line including current limiting.

DESCRIPTION OF PREFERRED EMBODIMENT

FIG. 1 depicts a UPS installation where AC power enters on lines 1 and 2 to an uninterruptible power supply 3 which contains a battery 4. Uninterrupted AC power is fed from lines 5 and 6 to a computer and/or peripherals or other loads 7.

FIG. 2 is a block diagram of the internal components of the UPS indicated by numeral 3 in FIG. 1. Input power enters on lines 1 and 2 and supplies a battery charger 11. Power from the battery charger is fed through lines 12 and 13 to charge battery 14 and supply power to an inverter 17. Inverter 17 generates AC power which outputs on lines 18 and 20 to a socket 21 into which any item or load needing uninterruptible AC power may be plugged.

FIG. 4 is a graphic representation of the power usage. The amount of energy allowed to be drawn from the power line is set a certain amount, in this case 40 watts.

Referring now to the circuit shown in FIG. 3, the power enters as before on lines 1 and 2 and is introduced to the primary 23 of a transformer 22. The secondary output of transformer 22 is rectified to a DC voltage by a pair of diodes 28 and 30 operating as a center tapped bridge net work with a center tap point 27 forming a common bus 29. Filtering is accomplished by capacitor 31. Any form on DC power supplied to filter capacitor 31 will supply the necessary voltage and current for a transistor 33 and a resistor 32. Transistor 33 is a series charging current regulator which controls both the voltage and current supplied to battery 14 by charger output line 12 and through a current sensor resistor 47 back to the common bus 29. Transistor 33 is biased "on" by current flowing through resistor 32 unless that current is caused to flow into either an operational amplifier 38 or 40. Operational amplifier 38 serves to shut down transistor 33 by drawing off the drive current whenever the voltage on battery 14 reaches or exceeds a predetermined amount. This amount is set by the values of voltage dividers 45 and 46 flowing in on the negative input of the operational amplifier. This voltage is compared to the voltage on a zener diode 44 which is biased to a predetermined amount by the current flowing through a resistor 43. As long as voltage on battery 14 is below this preset amount, transistor 33 will be "on" unless operational amplifier 40 turns it "off".

If the charging current in battery 14 exceeds a certain amount, the voltage across a current sensor resistor 47 will rise and it is presented, via resistor 51, to input 52 of operational amplifier 40. When the current into the battery and load combination becomes too high, the voltage across resistor 47 exceeds the voltage on an input 53 which is set by voltage dividers 48 and 51, using the zener diode 44 reference voltage, the transistor is turned "off". When the load plugged into socket 21 of FIG. 2 draws power from the inverter 17 of FIG. 2, the inverter will draw power from battery 14. This will reduce its voltage causing transistor 33 to turn "on". However, if the current exceeds a preset amount, operational amplifier 40 will override and limit the current in transistor 33 and the battery will be forced to supply the additional energy directly.

The previous description is of a series pass regulator functioning as the battery charger 11 that limits the power flowing into the battery and load combination to a predetermined amount.

Referring further to FIG. 4, with current limiting as described above, it can be seen that no more than the specified amount of power may be drawn from the power line. When the load is drawing less than the allowed amount then the rest of the power may be used to replace the power used from the battery (recharge) when the load needed more power than the allowed amount.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An uninterruptible power supply comprising:
   a source of direct current (DC) voltage and current;
   an inverter circuit;
   a battery coupled between said source of direct current (DC) voltage and current and said inverter circuit;
   a charging circuit included in said source of direct current (DC) voltage and current and coupled to said battery for recharging said battery while limiting the amount of power drawn from said source of direct current (DC) voltage and current to a predetermined amount;
   a current and voltage regulating transistor connected to said battery and biased "on" or partially "on" by feedback of voltage across and through said battery; and
   said charging circuit is a series pass regulator limited power flowing into said battery and to a load connected to said inverter.

2. The uninterruptible power supply defined in claim 1, wherein:
   said source of direct current (DC) voltage and current includes:
   a transformer coupled to a source of line power;
   a rectifier connected to said transformer;
   a filter connected to said rectifier;
   a pair of amplifiers connected in parallel with said transistor;
   a comparator network including a zener diode and a biasing resistor; and
   a voltage divider coupled between said comparator network and said battery.

3. The uninterruptible power supply defined in claim 2 including:
   a sensing resistor connected to said amplifier and said zener diode operable to detect charging current in said battery.

4. An uninterruptible power supply comprising:
   a source of AC line power;
   a filter rectifier circuit connected to said source of AC line power;
   a current regulator connected to said filter rectifier circuit;
   an amplifier network coupled to said current regulator;
   a comparator circuit connected to said amplifier network;
   a battery;
   a current sensing and voltage divider network coupled between said battery and said comparator circuit responsive to charging current in said battery for comparison with a voltage reference in said comparator circuit.

* * * * *